P. C. HEWITT.
SYSTEM OF ELECTRICAL DISTRIBUTION BY VAPOR CONVERTERS.
APPLICATION FILED FEB. 23, 1906.
1,110,554.
Patented Sept. 15, 1914.
2 SHEETS—SHEET 1.
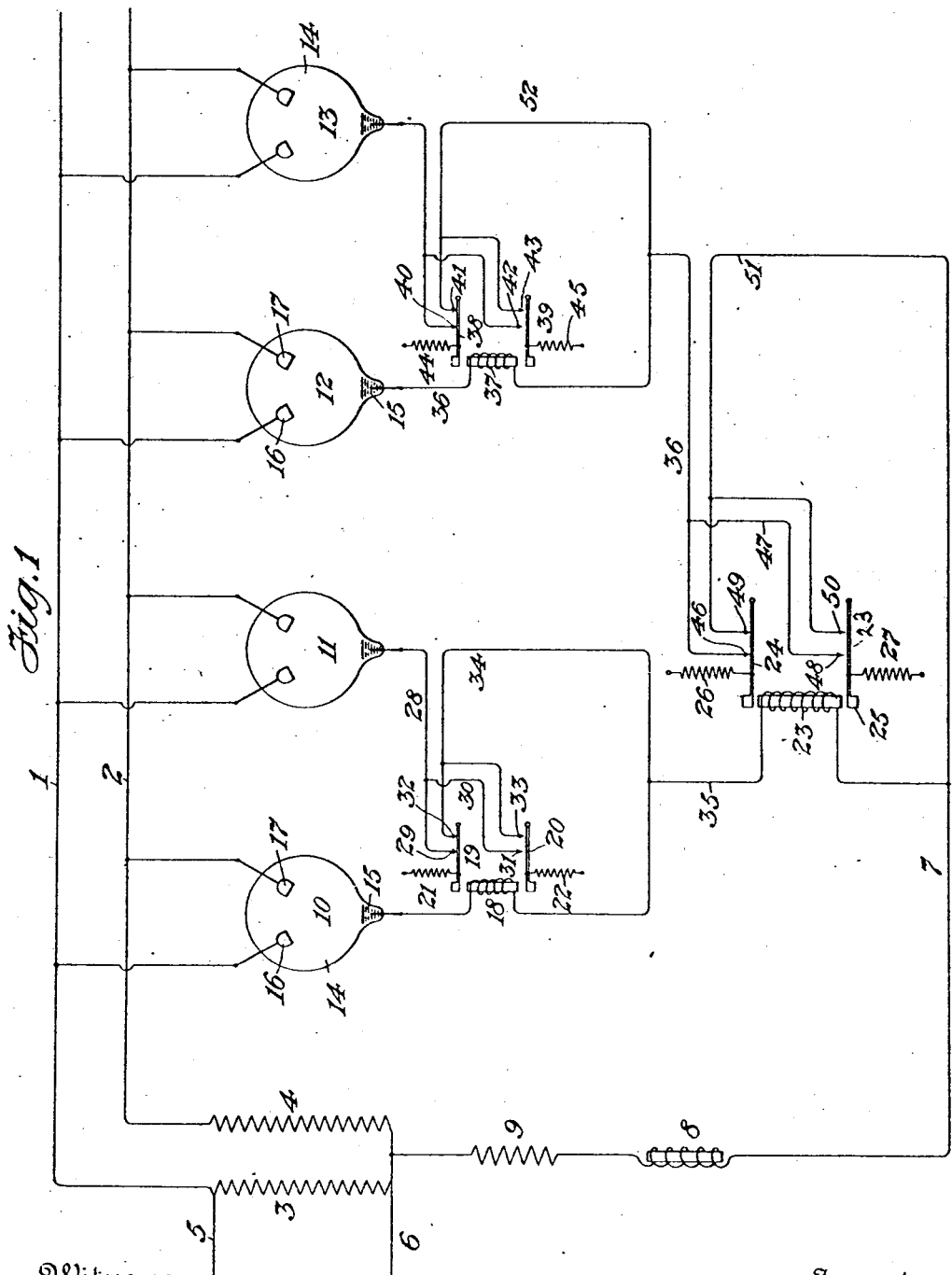

P. C. HEWITT.
SYSTEM OF ELECTRICAL DISTRIBUTION BY VAPOR CONVERTERS.
APPLICATION FILED FEB. 23, 1906.
1,110,554.
Patented Sept. 15, 1914.
2 SHEETS—SHEET 2.
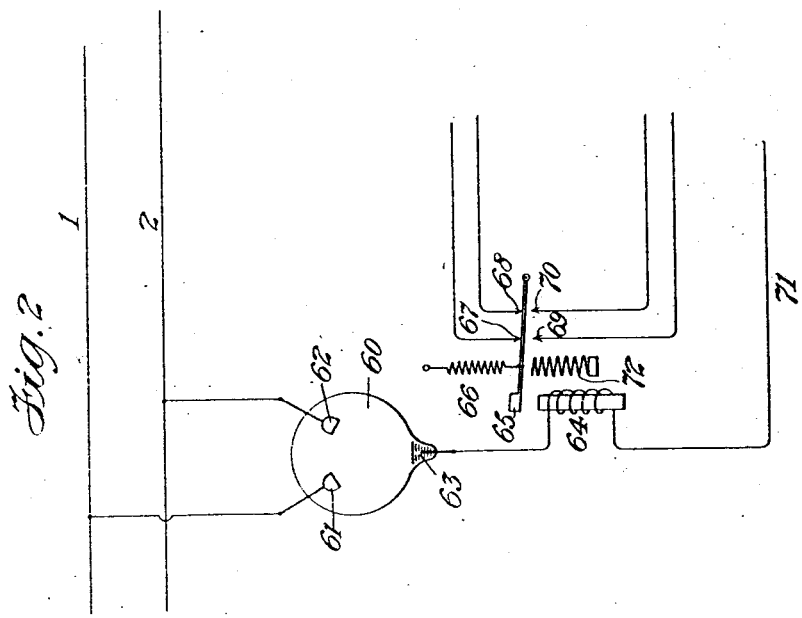

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC CO., OF HOBOKEN, NEW JERSEY, A CORPORATION OF NEW JERSEY.

SYSTEM OF ELECTRICAL DISTRIBUTION BY VAPOR-CONVERTERS.

1,110,554.   Specification of Letters Patent.   Patented Sept. 15, 1914.

Application filed February 23, 1906. Serial No. 302,343.

*To all whom it may concern:*

Be it known that I, PETER COOPER HEWITT, a citizen of the United States, and resident of New York, county of New York, State of New York, have invented certain new and useful Improvements in Systems of Electrical Distribution by Vapor-Converters, of which the following is a specification.

Systems of electrical distribution depending for the supply of direct current translating devices upon vapor converters interposed between the direct current side of the system and a source of alternating current are liable to get out of order or become inoperative through the failure of one or more of the vapor converters forming part of the system. To prevent the evil effects of such a happening, I have invented what I have called a self-substituting converter and this has been described and shown in my application number 207,756, filed May 13, 1904.

The present system is much more highly elaborated than the earlier one and provides for a number of conditions which were not provided for by the earlier invention.

The present invention will be understood by reference to the accompanying drawings, in which Figs. 1 and 2 are diagrams of circuits and apparatus adapted to assist in carrying out my invention.

In the drawings, 1 and 2 are main circuit wires leading from the terminals of an autotransformer, 3 and 4, which transformer is itself connected with leads, 5 and 6, extending from a main alternating current source (not shown). The conductors 1 and 2 carry alternating current which is to be supplied to a circuit, 7, leading through an inductance, 8, and a resistance, 9, or through any suitable translating devices to an intermediate point in the transformer 3—4. The two sides of the system thus described are connected with each other through vapor converters, 10, 11, 12 and 13 (see Fig. 1). These vapor converters are of the type now well-known in the arts and in general the preferred form of such converters consists of a container, 14, of glass or other suitable material, within which are contained a negative electrode, 15, generally of mercury and positive electrodes, 16 and 17, usually of some solid material, such as iron.

Taking the converter shown at 10 as an example, it will be seen that its two positive electrodes 16 and 17 are connected, respectively, to the conductors 1 and 2 while the negative electrode 15 is joined to the return circuit through various devices presently to be set forth. One such device is the magnet, 18, provided with two armatures, 19 and 20, the said armatures being normally retracted by springs, 21 and 22, respectively. Another of the devices in the lead from the negative electrode 15 of the converter 10 is a second magnet, 23, also having two armatures, 24 and 25, the same being retracted, respectively by springs, 26 and 27.

The connections described are those for the particular converter 10, those for the converter 11 being somewhat different. For example, the conductor 28 leading from the negative electrode 15 of the converter 11 extends to a backstop, 29, against which the armature 19 is adapted to rest, while a branch, 30, from the conductor 28 extends to a front stop, 31, for the armature 20. Another backstop, 32, for the armature 19 and another frontstop, 33, for the armature 20 are connected by a conductor, 34, with a conductor, 35, common to the circuits leading from the negative electrodes of both the converter 10 and the converter 11. When the armature 19 is retracted, the two backstops, 29 and 32 are connected thereby and a circuit through 28 and 34 is completed. On the other hand, a similar completion of the same circuit takes place in a different way when the armature 20 is drawn forward against the frontstops.

Another set of connections is illustrated at the right as associated with the converters 12 and 13. Taking 12, for example, the conductor 36 leading from its negative electrode 15 passes through a magnet, 37, having two armatures, 38 and 39, arranged with respect to backstops, 40 and 41, and frontstops, 42 and 43, respectively, in just the same way that the armatures 19 and 20 are related to the backstops 29 and 32 and the frontstops 31 and 33, respectively. There are also present the retractile springs, 44 and 45, for the respective armatures 38 and 39. Beyond the magnet 37 the conductor 36 extends to a backstop, 46, for the armature, 24, while a branch, 47, from the conductor 36 leads to a frontstop, 48, for the armature 25. The other backstop 49 and the other frontstop, 50, are connected to a conductor, 51, joined to the return side of the circuit 7.

The connections from the negative electrode 15 of the converter 13, at least as far as the point where the common circuit conductor 36 is joined by the branch conductor shown at 52, are perfectly clear in view of the exactly similar circuits shown and described in connection with the converter 11. Beyond the point named; that is to say, the point where the conductor 52 joins the conductor 36, the circuits are, of course, identical with those shown and described in connection with the converter 12. Now, let it be assumed that the converter marked 10 in Fig. 1 is put into operation by any suitable means for starting or that the conditions are such that when ten amperes are flowing through the circuit, 7, this converter will itself automatically start. When started, and running on ten amperes, the magnet 18 attracts its armature 19 and draws it from the backstops 29 and 32 thereby cutting out the converter 11 which will not be cut in again until for some reason the current in the system falls below ten amperes, thereby releasing the armature 19 until it falls against the backstops or until the current is increased, say, to twenty-one amperes or to any other predetermined number greater than ten, thereby attracting the armature 20 and connecting the said armature with the frontstops 31 and 33. This would throw into circuit the converter 11 which would then be in a condition to operate. Now, we may arrange the conditions so that some intermediate current represented, say, by eleven amperes will cut in the converter 12 by the action of the magnet 23 drawing up the armature 25 and drawing down the armature 24. At the same time, the magnet 37 may be assumed to have cut-out the converter 13 by drawing down the armature 38, whereas the said converter will not be cut in again until the armature falls back or the armature 39 is drawn up making electrical connection between the frontstops 42 and 43. It will be understood that the magnet 23 does not operate either of its armatures until at least eleven amperes are passing through the system, but that ten amperes are sufficient to cause the magnet 18 to operate its armature 19. When eleven amperes begin to flow the armature 24 of the magnet 23 is drawn down and when twenty-one amperes flow through the circuit the armatures 20, 25 and 39 are all actuated and the converters 11 and 12 are cut in. It will be further understood that if at eleven amperes either the converter 10 or the converter 12 breaks then the converter 11 or the converter 13 is cut in, or both, by reason of the fact that the armatures 19 and 38 are released and make electrical connection between their respective backstops.

In Fig. 2 I show other means for rendering effective the differential action at the various magnets. Here I, illustrate a converter, 60, having positive electrodes, 61 and 62, and a negative electrode, 63, as being joined between supply wires or conductors 1 and 2 and a consumption system connected with a wire 71. The switching operation is performed by a magnet, 64, having a single armature, 65, normally withdrawn by a retractile spring, 66. The backstops, 67 and 68, and the frontstops, 69 and 70, correspond essentially to the stops illustrated, for example, in Fig. 1 at 29 and 32 on the one hand, and 31 and 33 on the other. In the path of the downward movement of the armature 65 I place a spring, 72, of considerable resistance which resistance must be overcome to a degree before the armature will make contact with the front stops, 69 and 70.

We may now assume that the spring 66 will be stretched or extended under the influence of say ten amperes of current, thereby breaking the connections at 67 and 68, for cutting out a converter (not shown) having the same connections with the supply circuit as the converter marked 60, and we may further assume that the spring 72 is of sufficient rigidity to prevent contact between the frontstops, 69 and 70, under the influence of a smaller amperage than twenty-one amperes. Thus, a similar effect is produced by the single armature 65 and the springs 66 and 72 as were produced in the embodiment illustrated in Fig. 1 by the double armatures and their respective springs.

It will be understood that other variations from the type illustrated in Fig. 1 may be made without departing from the essential spirit of the present invention.

It is understood that the number of amperes here given is purely illustrative, and should in no way limit this invention. It may be noted that by the arrangement shown herein the various magnet coils, as 18, 23, and 37, being in the direct current leads of the rectifiers, a favorably located sustaining action is obtained and the functions of the coil, 8, assisted. The location of an inductive coil in the cathode lead of a rectifier is very often the most effective and practical means for bridging the zero point of an alternating supply in a vapor rectifier.

The operation of applicant's device may be summarized as follows. In Fig. 1 under conditions in which current is less than a certain minimum, as for example 10 amperes in some particular case, all the rectifiers will be connected in multiple in virtue of the release of the levers 24, 19 and 38. With a somewhat larger current all the rectifiers, except 10, will be cut out of circuit by the attraction of the above named levers by the currents in the magnet coils 23, 18 and 37 respectively. This represents the normal low current condition. Should now a failure occur in the rectifier 10, current falls below the assumed minimum value above mentioned, there taken as 10, and other rectifiers are thrown in parallel until one is found which is in operative condition. On the other hand a further increase in current above a second higher minimum will operate upon the lower levers 23, 20 and 39 throwing in enough rectifiers to maintain the current in any particular rectifier within the safe limit therefor, all as above described. In other words at any time when the current in either of the coils 23, 18 or 37 remains above the upper limit chosen, additional rectifiers will be thrown in parallel, enough rectifiers operating to maintain current in each coil below the upper limit. While in case current falls below the lower limit, say 10 amperes, as in case of a broken bulb, additional rectifiers are automatically thrown in by the release of the armatures 24, 19 and 38 by magnets 23, 18 and 37 respectively until a serviceable rectifier is found which will restore the current value above the lower minimum. In Fig. 2 the same operation is found, a single armature, however, serving to close and open the several circuits of Fig. 1 as utilized in connection with the rectifiers 10 and 12. The same action of cutting in and out in response to currents rising above the upper minimum or falling below the lower will result.

I claim as my invention:

1. The combination with a source of alternating current, a plurality of groups of mercury vapor rectifiers fed from said source and a common direct current work circuit fed by the rectifiers, of means for causing the cessation of current in one group of said rectifiers to connect the direct current main from a second group of rectifiers to the work circuit, together with means in each of the above named groups whereby a cessation of current in one rectifier connects the lead of the direct current electrode of another rectifier in the same group to the direct current bus bars, all of said means being located in the portion of the system traversed by direct current.

2. The combination with a source of alternating current, a plurality of mercury vapor rectifiers fed from said source, and a common direct current work circuit fed by the said rectifiers, of means for connecting the direct current lead of one of said rectifiers to the work circuit when the rectified current of another rectifier is less than one limiting current value or greater than a second limiting current value, said means being located in the lead of the direct current electrode of the last named converter.

Signed at New York, in the county of New York, and State of New York, this 20th day of February A. D. 1906.

PETER COOPER HEWITT.

Witnesses:
Wm. H. Capel,
Thos. H. Brown.